(12) United States Patent
Maso et al.

(10) Patent No.: US 12,382,489 B2
(45) Date of Patent: Aug. 5, 2025

(54) TRANSMISSION OF PARAMETER

(71) Applicant: Nokia Technologies Oy, Espoo (FI)

(72) Inventors: Marco Maso, Issy les Moulineaux (FR); Axel Mueller, Paris (FR); Nhat-Quang Nhan, Reims (FR); Karri Markus Ranta-Aho, Espoo (FI); Amir Mehdi Ahmadian Tehrani, Munich (DE)

(73) Assignee: Nokia Technologies Oy, Espoo (FI)

( * ) Notice: Subject to any disclaimer, the term of this patent is extended or adjusted under 35 U.S.C. 154(b) by 603 days.

(21) Appl. No.: 17/704,080

(22) Filed: Mar. 25, 2022

(65) Prior Publication Data

US 2022/0312492 A1    Sep. 29, 2022

(30) Foreign Application Priority Data

Mar. 29, 2021 (FI) ...................................... 20215362

(51) Int. Cl.
*H04W 74/0833* (2024.01)
*H04W 74/00* (2009.01)
*H04W 74/0836* (2024.01)

(52) U.S. Cl.
CPC ..... *H04W 74/0833* (2013.01); *H04W 74/002* (2013.01); *H04W 74/0836* (2024.01)

(58) Field of Classification Search
CPC ......... H04W 74/0833; H04W 74/0836; H04W 72/23
See application file for complete search history.

(56) References Cited

U.S. PATENT DOCUMENTS

| | | | |
|---|---|---|---|
| 10,419,990 B2 * | 9/2019 | Uemura | H04W 36/04 |
| 2010/0220713 A1 * | 9/2010 | Tynderfeldt | H04W 56/0045 370/350 |
| 2018/0279375 A1 * | 9/2018 | Jeon | H04W 72/23 |
| 2020/0120709 A1 | 4/2020 | Bergquist et al. | |
| 2022/0132581 A1 * | 4/2022 | Jiang | H04W 74/0833 |
| 2022/0312492 A1 * | 9/2022 | Maso | H04W 74/002 |
| 2023/0007702 A1 * | 1/2023 | Park | H04L 5/0094 |

OTHER PUBLICATIONS

3GPP TSG RAN WG1 #104-e, e-Meeting, Jan. 25-Feb. 5, 2021, R1-2100401, "Discussion on Type A PUSCH repetitions for Msg3", CATT, 5 pgs.

* cited by examiner

*Primary Examiner* — Raj Jain
(74) *Attorney, Agent, or Firm* — McCarter & English LLP

(57) ABSTRACT

According to an example aspect of the present invention, there is provided an apparatus, such as a user equipment, including at least one processing core, at least one memory including computer program code, the at least one memory and the computer program code being configured to, with the at least one processing core, cause the apparatus at least to initiate a random access process with a network by transmitting an initial random access message to the network, receive a random access response from the network, the random access response including a timing advance command bit sequence, determine from the timing advance command bit sequence a timing advance value and a configuration parameter, and transmit a request message to the network at least once in compliance with the configuration parameter.

8 Claims, 6 Drawing Sheets

| | | | |
|---|---|---|---|
| 205A | R | 220 | |
| 205B | | 220 | 230 |
| 205C | | 230 | |
| 206D | | 230 | |
| 206E | | 230 | |
| 206F | | 240 | |
| 206G | | 240 | |

TRANSMISSION OF PARAMETER

FIELD

The present disclosure relates to configuring repetitions of messages in wireless communication systems.

BACKGROUND

In wireless communication systems, such as cellular systems, random access processes may be used to initialize connectivity toward the network. Contention based access may be used for such initial accessing, for example.

A dedicated physical radio channel may be provided for initiating random access processes from a user equipment toward the network.

On the other hand, in cellular systems the cell size may be such that accounting for a propagation delay of signals being exchanged between user equipments and base stations may be employed. Thus the base station and the user equipment may be knowledgeable, at least to a certain accuracy, of the distance between them. A random access process may establish synchronization between the user equipment and the network.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to initiate a random access process with a network by transmitting an initial random access message to the network, receive a random access response from the network, the random access response comprising a timing advance command bit sequence, determine from the timing advance command bit sequence a timing advance value and a configuration parameter, and transmit a request message to the network at least once in compliance with the configuration parameter.

According to a second aspect of the present disclosure, there is provided an apparatus comprising at least one processing core, at least one memory including computer program code, the at least one memory and the computer program code being configured to, with the at least one processing core, cause the apparatus at least to receive an initial random access message from a user equipment, construct a timing advance command bit sequence based on a timing advance value and a configuration parameter, transmit a random access response for the user equipment, the random access response comprising the timing advance command bit sequence, and receive a request message from the user equipment at least once in compliance with the configuration parameter.

According to a third aspect of the present disclosure, there is provided a method comprising initiating a random access process with a network by transmitting an initial random access message to the network, receiving a random access response from the network, the random access response comprising a timing advance command bit sequence, determining from the timing advance command bit sequence a timing advance value and a configuration parameter, and transmitting a request message to the network at least once in compliance with the configuration parameter.

According to a fourth aspect of the present disclosure, there is provided a method, comprising receiving an initial random access message from a user equipment, constructing a timing advance command bit sequence based on a timing advance value and a configuration parameter, transmitting a random access response for the user equipment, the random access response comprising the timing advance command bit sequence, and receiving a request message from the user equipment at least once in compliance with the configuration parameter.

According to a fifth aspect of the present disclosure, there is provided an apparatus comprising means for initiating a random access process with a network by transmitting an initial random access message to the network, means for receiving a random access response from the network, the random access response comprising a timing advance command bit sequence, means for determining from the timing advance command bit sequence a timing advance value and a configuration parameter, and means for transmitting a request message to the network at least once in compliance with the configuration parameter.

According to a sixth aspect of the present disclosure, there is provided an apparatus comprising means for receiving an initial random access message from a user equipment, means for constructing a timing advance command bit sequence based on a timing advance value and a configuration parameter, means for transmitting a random access response for the user equipment, the random access response comprising the timing advance command bit sequence, and means for receiving the request message from the user equipment at least once in compliance with the configuration parameter.

According to a seventh aspect of the present disclosure, there is provided a non-transitory computer readable medium having stored thereon a set of computer readable instructions that, when executed by at least one processor, cause an apparatus to at least initiate a random access process with a network by transmitting an initial random access message to the network, receive a random access response from the network, the random access response comprising a timing advance command bit sequence, determine from the timing advance command bit sequence a timing advance value and a configuration parameter, and transmit a request message to the network at least once in compliance with the configuration parameter.

According to an eighth aspect of the present disclosure, there is provided a non-transitory computer readable medium having stored thereon a set of computer readable instructions that, when executed by at least one processor, cause an apparatus to at least receive an initial random access message from a user equipment, construct a timing advance command bit sequence based on a timing advance value and a configuration parameter, transmit a random access response for the user equipment, the random access response comprising the timing advance command bit sequence, and receive a request message from the user equipment at least once in compliance with the configuration parameter.

According to a ninth aspect of the present disclosure, there is provided a computer program configured to cause at least the following to be performed by an apparatus, when run: initiating a random access process with a network by transmitting an initial random access message to the network, receiving a random access response from the network, the random access response comprising a timing advance command bit sequence, determining from the timing advance command bit sequence a timing advance value and a configuration parameter, and transmitting a request message to the network at least once in compliance with the configuration parameter.

According to a tenth aspect of the present disclosure, there is provided a computer program configured to cause at least the following to be performed by an apparatus, when run: receiving an initial random access message from a user equipment, constructing a timing advance command bit sequence based on a timing advance value and a configuration parameter, transmitting a random access response for the user equipment, the random access response comprising the timing advance command bit sequence, and receiving a request message from the user equipment at least once in compliance with the configuration parameter.

EMBODIMENTS

Repetition of a request message stemming from a random access process may enhance communication quality and/or coverage of a cell in a wireless communication system. In accordance with embodiments described herein, a request message repetition parameter is signalled from a base station to a user equipment to control the repeating of such a request message. The request message may be known, depending on the technology used, as "msg3", for example. The request message repetition parameter is signalled using a timing advance command bit sequence comprised in a random access response message sent from the base station. The same timing advance command bit sequence is used to signal, directly or indirectly, a timing advance value.

Figure 1:
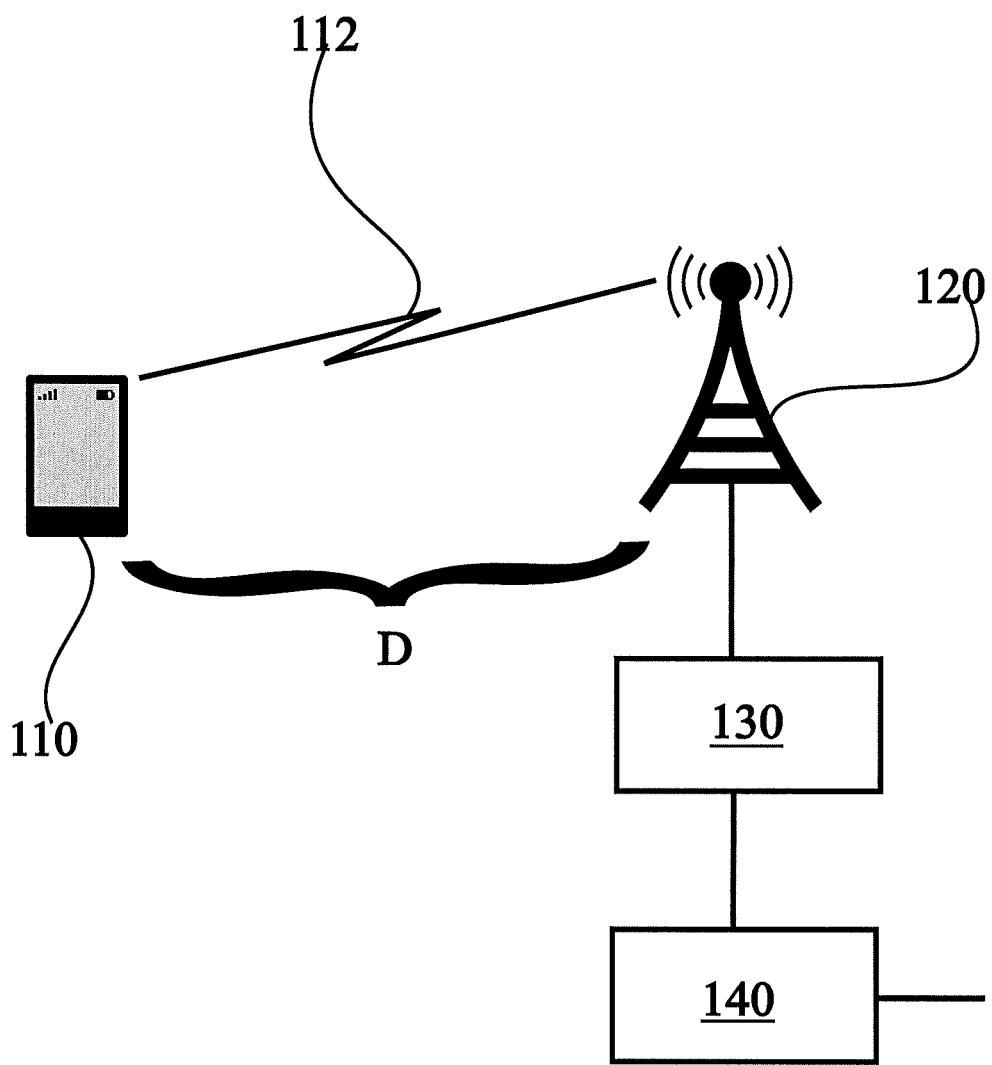
FIG. 1 illustrates an example system in accordance with at least some embodiments of the present invention.

FIG. 1 illustrates an example system in accordance with at least some embodiments of the present invention. The figure comprises UE 110, which may comprise, for example, a machine-type communication device, such as a smart utility meter, connected car connectivity device or an automated sensor, for example. Further, UE 110 may comprise a user device, such as a smartphone, feature phone, tablet computer, laptop computer or desktop computer, for example. Base station 120 is configured to control at least one cell of a cellular communication system. Examples of cellular communication systems include long term evolution, LTE, and fifth generation, 5G, systems as specified by the 3$^{rd}$ generation partnership project, 3GPP. Also non-3GPP cellular system exist and may be usable with principles disclosed herein. Depending of the specific technology used, base station 120 may also be known by another name as well, such as "gNB", however the term base station is used herein with no implied limitation to a specific access technology. UE 110 may be battery-powered, and/or powered by a stable connection to electrical power.

In detail, UE 110 may communicate with base station 120 using wireless link 112. Wireless link 112 may comprise an uplink for transmitting information from UE 110 to base station 120, and a downlink for transmitting information from base station 120 to UE 110. Wireless link 112 is configured in accordance with a technology that UE 110 and base station 120 are both configured to support, thus providing interoperability between these devices. For example, the technology may be a cellular technology such as LTE or 5G.

Base station 120 is connected with control node 130, which may comprise, depending on system architecture, a radio access network controller or a core network node, for example. Control node 130 may be operatively connected, directly or indirectly, with gateway 140, which is configured to provide connectivity to further networks, such as the Internet, for example.

Where the cellular system employs radio frames with defined start and end times, UEs within a coverage area of a cell controlled by base station 120 may employ a timing advance value in selecting a point in time, when to transmit messages to base station 120 such that these messages arrive at base station 120 within acceptable radio frame boundaries and without collisions to preceding or subsequent frames. In FIG. 1, a distance D is schematically illustrated between UE 110 and base station 120. The timing advance value thus is used to account for signal propagation delay of wireless link 112. The distance D is schematic since the distance covered by messages on wireless link 112 is not necessarily directly the distance between UE and base station, but may be longer in case wireless link 112 reaches base station 120 from UE 110 via one or more reflections.

To conduct a random access process with base station 120, UE 110 may initiate the random access process by transmitting an initial random access message. The goals of the random access process include establishing synchronization with base station 120 and obtaining a radio resource for transmitting a request message, which may be known as a "msg3", for example. In practical terms, the msg3 may comprise a radio resource connection, RRC, connection request, for example. This initial message may comprise a random access preamble, for example. The initial message may be transmitted from UE 110 on a physical random access channel, for example. The initial message may comprise an explicit or implicit indication to the network, that UE 110 supports repetition of the msg3. In some embodiments, the indication that UE 110 supports msg3 repetition is a separate random access preamble transmitted by UE 110, or comprised another kind of message separate from the initial message.

Responsive to the initial random access message, base station 120 is configured to transmit to UE 110 a response in the form of a random access response, RAR, which may be known as a RAR or an msg2, for example. The random access response may be sent over a physical random access channel, for example. Where the random access response is sent over a physical random access channel, it may be the same one as was used to transmit the initial message. The random access response comprises information for UE 110 to achieve the synchronization and attachment to the network. In particular, the random access response comprises a radio resource grant informing UE 110 of which radio resources, such as time, frequency and/or code, UE 110 may use in transmitting a subsequent request message, which may be known as msg3 as noted above.

Further, the random access response comprises a timing advance command bit sequence. The timing advance command bit sequence may be 12 bits long or 8 bits long, for example. As is known, a bit sequence can be used to indicate a numerical value. The timing advance command bit sequence is used to determine the timing advance value by a mathematical mechanism which depends on the specific access technology and scenario being used. For example, when the timing advance command bit sequence is 12 bits long, it may be used to indicate a numerical value of between 0 and 4095. It has been discovered, that often the full range of numerical values that the timing advance command bit sequence is capable of indicating is not needed to convey the information needed to determine the timing advance value. In such cases, the remaining part of the range of numerical values may be used to convey a request message repetition parameter. In such cases, both the timing advance value and the request message repetition parameter may be determined from the timing advance command bit sequence, as will be described herein below. For example, a UE 110 configured to support msg3 repetition may inform the network of this capability, and this UE may be configured to determine both the timing advance value and the request message repetition parameter from the timing advance command bit sequence in the random access response.

When the request message repetition is instructed by base station 120, UE 110 may transmit the request message in accordance with the radio resource grant in the random access response, repeated one or more times in accordance with the request message repetition parameter. The request message may comprise an RRC connection request, for example. The radio resources granted for the request message may be on a physical uplink shared channel, for example. The request message repetition parameter may indicate a specific number of repetitions, or it may indicate simply whether or not repetitions are indicated.

Repeating messages comprised in, or stemming from, a random access process provides the benefit that cell size may be made larger, since the repeated messages may be combined to decode their contents successfully, also in some cases where a single transmission of such a message would not result in successful reception of the content. In some cases the repeated request messages are not combined at the receiver end, but the repeated request messages are simply each attempted to be decoded. In some embodiments, also the initial random access message and/or the random access response may be repeated. In at least some embodiments, the initial random access message, the random access response and the request message are comprised in the random access process.

In particular, the repetition of the response message so configured may be a so-called type A repetition, which comprises that the UE transmits the response message repeatedly, in consecutive slots once per slot without feedback. In type A repetition, each slot contains only one repetition of the response message. Type B repetitions comprise other than exactly one repetition per slot, including possible fractional repetitions.

Figures 2A, 2B:
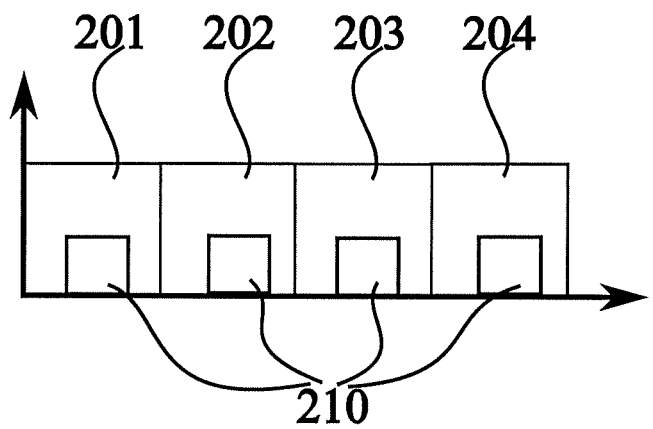
FIG. 2A illustrates a type A repetition.
FIG. 2B illustrates an example data structure in accordance with at least some embodiments of the present invention.

FIG. 2A illustrates a type A repetition. Time advances along the horizontal axis from the left to the right, while power increases along the vertical axis from the top toward the bottom. Consecutive slots 201, 202, 203 and 204 are illustrated in FIG. 2A, and repetitions of a request message 210 are present in four consecutive slots. In this case the repetition is four-fold in that the request message is transmitted four times.

FIG. 2B illustrates an example data structure in accordance with at least some embodiments of the present invention. The data structure is comprised in a random access response message, for example an msg2 message sent from base station 120 to UE 110. The example data structure of FIG. 2B comprises octets 205A-206G, as illustrated. A reserved bit sequence is denoted R, with the timing advance command bit sequence 220 extending from octet 205A to octet 205B. Uplink grant 230 extends from octet 205B to octet 206E. The data structure further comprises a radio network temporary identifier 240 in octets 205F and 205G. The order of bit fields in the data structure is not important, as long as both UE and base station know where to place and recover the respective bit fields, respectively.

Determining the timing advance value and the request message repetition parameter from the timing advance command bit sequence 220 may be performed in a number of ways, of which the following four examples are provided.

In a first example, the timing advance value and the request message repetition parameter are determined by determining the timing advance value from a first subset of numerical values the timing advance command bit sequence can indicate and by determining the request message repetition parameter from a second subset of numerical values the timing advance command bit sequence can indicate, the first and second subsets not sharing any numerical values. In this example, one number in the numerical range the timing advance command bit sequence can indicate is chosen to indicate triggering of the request message repetition procedure for all UEs supporting this repetition. In case the numerical value indicated by the entire timing advance command bit sequence exceeds the chosen number, request message repetition is indicated. In some embodiments of the first example, a first subset of bits of the timing advance command bit sequence is used to indicate the timing advance value and a second subset of bits of the timing advance command bit sequence is used to indicate the request message repetition parameter, the subsets not sharing any bits.

For example where the timing advance command bit sequence is 12 bits long, the sequence may be determined as sequence_sent=(timing advance value mod 2047)+Trigger*2048, where the Trigger is zero or one, with one indicating repetitions of the request message and zero indicating no repetitions. The value of Trigger would be the request message repetition parameter in this example.

This convention would limit the range of timing advance values to less than 2048, however in practical implementations this is not a problem, as zero to 2047 provides sufficient capability to initialize the timing advance value in most practical situations.

In a second example, the timing advance value and the request message repetition parameter are determined by determining that the request message repetition parameter indicates request message repetition responsive to a numerical value indicated by the timing advance command bit sequence exceeding a predetermined threshold value, and when this is the case, by determining the timing advance value based on by how much the numerical value exceeds the predetermined threshold value. In this example, one number in the numerical range the timing advance command bit sequence can indicate is chosen to indicate triggering of repetition procedure for all UEs supporting request message repetition.

For example where the timing advance command bit sequence is 12 bits long, the sequence may be determined as sequence_sent=(timing advance value mod 3846) when repetition is not indicated, and sequence_sent=3846+(timing advance value mod 248) to indicating repetitions. The request message repetition parameter would then indicate repetition or indicate no repetition, accordingly.

In this example, the timing advance value is limited to 248 steps when repetition is triggered, which may in practical implementations, such as in 3GPP networks, correspond to a maximum cell size of about 19 kilometres which is sufficient for most real-life cells. The cell ranges may be increased in the cases of this example where repetitions are triggered by including a scaling formula in use of the timing advance value. A value for the scaling may be communicated to the UE by the network in such cases. In effect, the timing advance value steps would be scaled such that the 248 steps (or the respectively chosen number of steps) can indicate also a propagation delay at the cell edge. The scaling would make the timing advance steps coarser, which might have a limited effect on initial signal-to-noise ratio. The base station, or another network node, may choose the scaling factor based on the cell size.

Such a scaling factor may take the form of timing_advance_in_seconds=(timing advance value×scale+offset timing advance value)×Tc. Here Tc is a reference time value, and scale may be selected e.g. so that the available timing advance steps may span an entire supported cell size. The offset timing advance value is a delay value corresponding to delays incurred in antennas, amplifiers and other components.

The second example provides the advantage that it enables communicating the timing advance value to UEs not supporting request message repetition in exactly the legacy manner.

In a third example, the timing advance value and the request message repetition parameter are determined by determining the timing advance value from a first subrange of numerical values the timing advance command bit sequence can indicate and by determining the request message repetition parameter from a second subrange of numerical values the timing advance command bit sequence can indicate, the first and second subranges not sharing any numerical values, the request message repetition parameter indicating a number of indicated repetitions. In other words, a subset in the numerical range the timing advance command bit sequence can indicate is used to indicate triggering of repetition procedure and configuration of the repetition for all UEs which support repetition of the request message.

For example, where the timing advance command bit sequence is 12 bits long, the sequence may be determined as follows. A number of repetitions RN is selected in the network from the set {0, 1, 2, 3}.

The timing advance command bit sequence may then be determined as sequence_sent=(timing advance value mod 1024)+RN×1024. The RN in this example is the request message repetition parameter, and RN=0 indicates no repetitions. In this example, more than a thousand timing advance steps can be signalled, which is enough for practical implementations.

In a fourth example, the timing advance value and the request message repetition parameter are determined by determining a numerical value indicated by the timing advance command bit sequence, responsive to the numerical value being less than a preconfigured value, determining the timing advance value based on the numerical value and determining that the request message repetition parameter indicates no repetitions, and responsive to the numerical value being at least the preconfigured value, determining both the timing advance value and the request message repetition parameter based on by how much the numerical value exceeds the preconfigured value. A subset in the numerical range the timing advance command bit sequence can indicate is chosen to indicate triggering of the repetition procedure and configuration of the repetition for all UEs which support request message repetition.

For example where the timing advance command bit sequence is 12 bits long, the sequence may be determined as follows. A number of repetitions RN is selected in the network from the set {0, 1, 2, 3}. The RN in this example is the request message repetition parameter.

The timing advance command bit sequence may then be determined as sequence_sent=(timing advance value mod 3846) when RN=0, and sequence_sent=3846+(RN−1)×82+(timing advance value mod 82) when RN≠0.

The timing advance value may be set to between zero and 3846 when RN=0, but when RN>0 the number of timing advance values available for signalling is only 82 steps. A scaling process may be used as in the second example to extend the usefulness of the 82 timing advance value steps. Without scaling, 82 timing advance value steps could support a cell radius of about 6.4 kilometres in a 3GPP network.

In embodiments where the request message repetition parameter indicates repetition or not repetition, but does not indicate number of repetitions, the number of repetitions may be signalled separately, such as, for example, by broadcast messaging. In these cases, the request message repetition parameter is used to trigger the separately configured repetitions.

Figure 3:
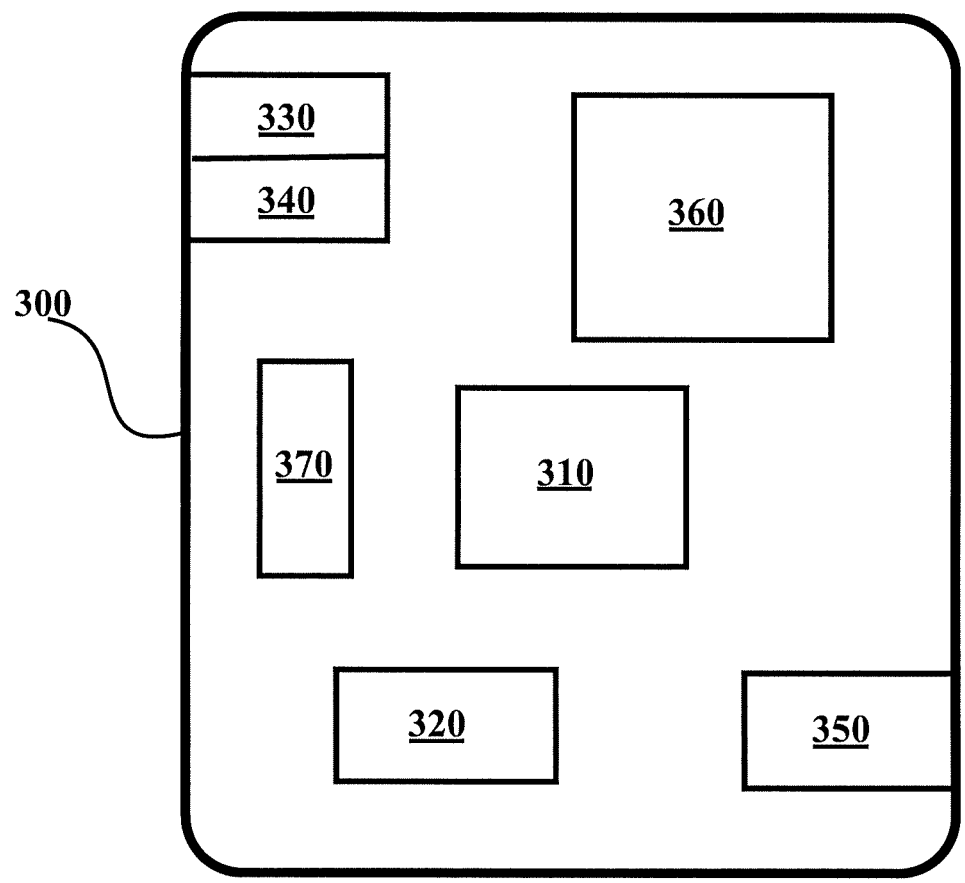
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a UE 110 or, in applicable parts, base station 120 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps, such as initiating, receiving, determining, transmitting and constructing, in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more of all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
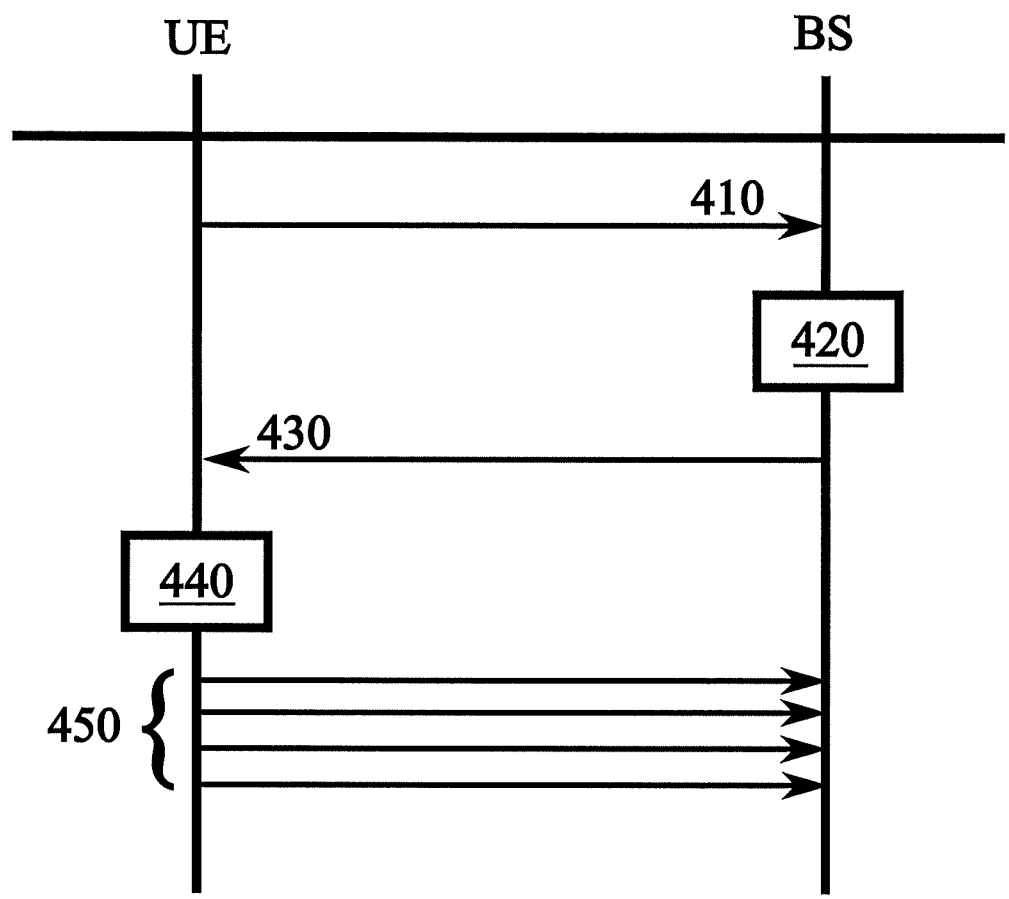
FIG. 4 illustrates signalling in accordance with at least some embodiments of the present invention.

FIG. 4 illustrates signalling in accordance with at least some embodiments of the present invention. On the vertical axes are disposed, on the left, UE 110 of FIG. 1, and on the right, a base station. Time advances from the top toward the bottom.

In phase 410, the UE transmits the initial message to the base station, thereby initiating the random access process. As described herein above, the initial message may comprise an indication the UE supports request message repetition, or such an indication may be provided separately from the UE to the network.

In phase 420, the base station determines whether to configure request message repetition for the UE. For example, the base statin may determine whether the UE supports request message repetition, and whether request message repetition is necessary. The base station may base this determination at least in part on an identity of a preamble received in the initial message. For example, in some embodiments where the received preamble is less than a threshold preamble length long, the base station may consider employing the repetition of the request message. The reason for this is that shorter preambles are associated with smaller cells, wherefore the entire normal range of timing advance values will not be needed. In other embodiments, the base station may conclude that employing the repetition of the request message is necessary, as previous random access procedures have failed after transmission of the random access response.

In phase 430, the base station transmits a random access response to the UE, the random access response comprising the timing advance command bit sequence which the base station has selected in dependence of the timing advance value and the request message repetition parameter. For example, the timing advance command bit sequence may 12 bits long.

In phase 440, the UE determines the timing advance value and the request message repetition parameter from the timing advance command bit sequence, for example as described herein above. In the example of FIG. 4, the request message repetition parameter indicates fourfold transmission of the request message.

Finally, in phase 450 the UE transmits the request message four times, as instructed by the request message repetition. The transmissions may be type A repetitions, for example. The transmissions may be performed at points in time selected in dependence of the timing advance value.

Figure 5:
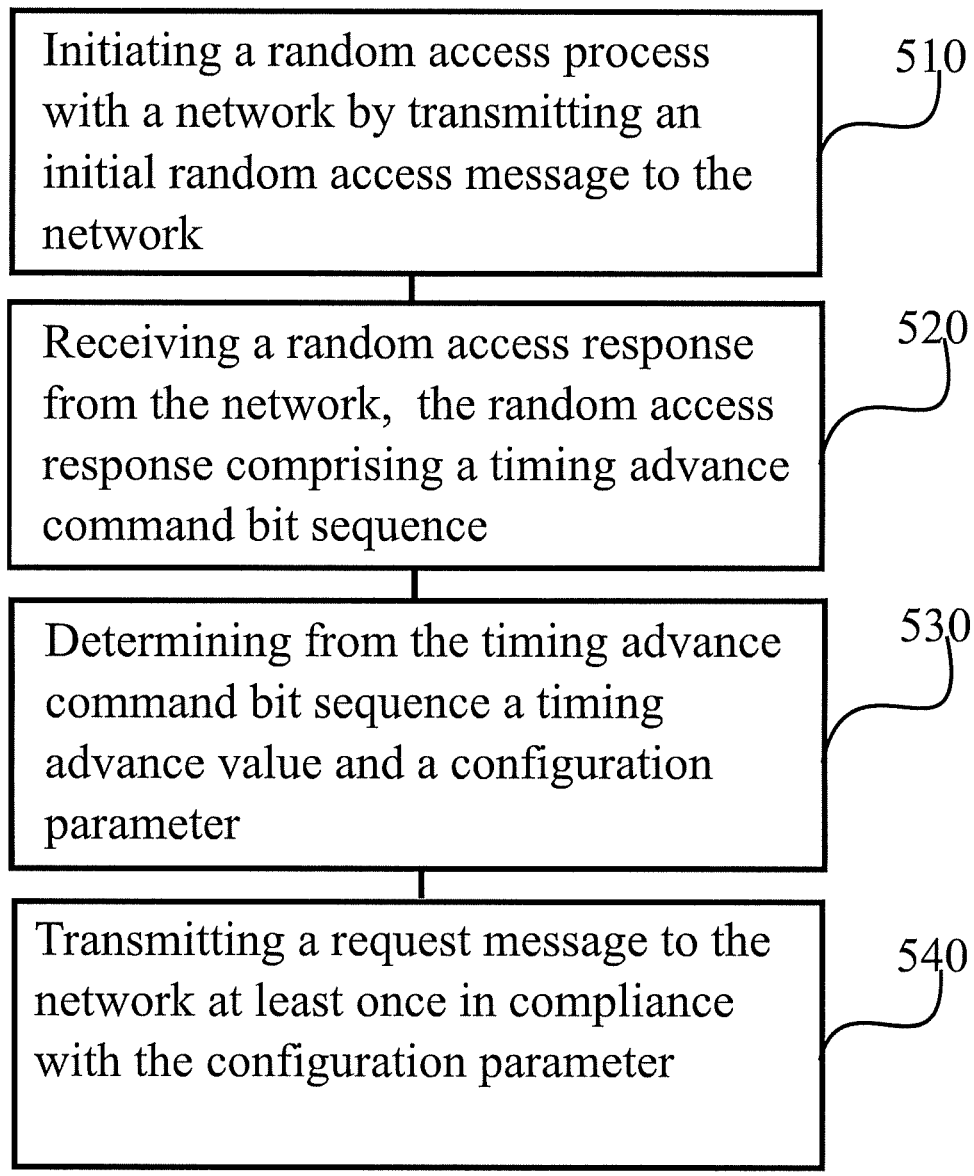
FIG. 5 is a flow graph of a method in accordance with at least some embodiments of the present invention.

FIG. 5 is a flow graph of a method in accordance with at least some embodiments of the present invention. The phases of the illustrated method may be performed in UE 110, or in a control device configured to control the functioning thereof, when installed therein.

Phase 520 comprises initiating a random access process with a network by transmitting an initial random access message to the network. Phase 520 comprises receiving a random access response from the network, the random access response comprising a timing advance command bit sequence. Phase 530 comprises determining from the timing advance command bit sequence a timing advance value and a configuration parameter. Phase 540 comprises transmitting a request message to the network at least once in compliance with the configuration parameter.

Figure 6:
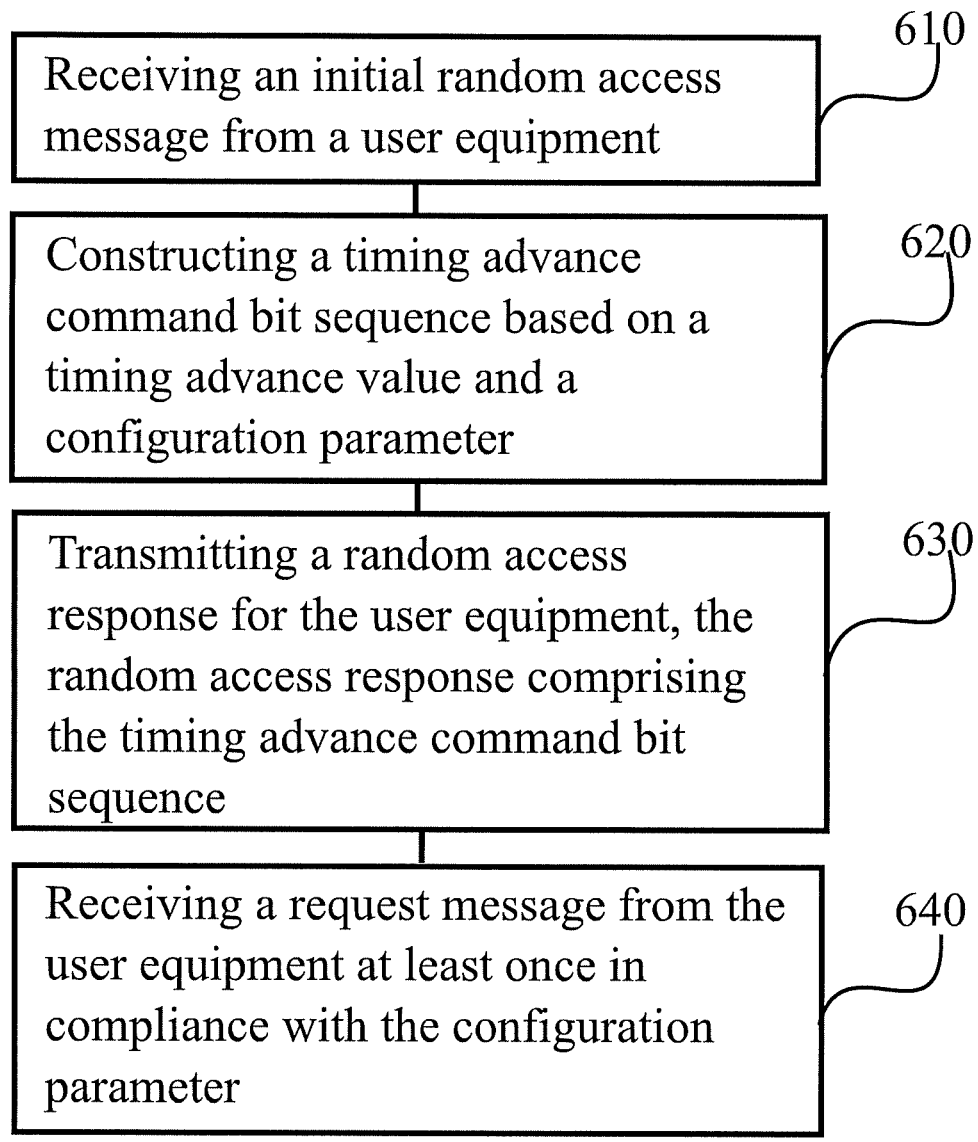
FIG. 6 is a flow graph of a method in accordance with at least some embodiments of the present invention.

FIG. 6 is a flow graph of a method in accordance with at least some embodiments of the present invention. The phases of the illustrated method may be performed in base station 120, or in a control device configured to control the functioning thereof, when installed therein.

Phase 610 comprises receiving an initial random access message from a user equipment. Phase 620 comprises constructing a timing advance command bit sequence based on a timing advance value and a configuration parameter. Phase 630 comprises transmitting a random access response for the user equipment, the random access response comprising the timing advance command bit sequence. Finally, phase 640 comprises receiving a request message from the user equipment at least once in compliance with the configuration parameter.

In terms of FIGS. 5 and 6, the configuration parameter may comprise the request message repetition parameter discussed herein above. Alternatively to the request message repetition parameter, the configuration parameter may comprise a trigger to use a different frequency allocation, for example.

Overall, the following benefits may be achieved using the signalling solutions described above: indicating triggering and configuration of Type A Msg3 repetition in fully legacy transparent ways. Indicating triggering and configuration of Type A Msg3 repetition for groups of coverage enhanced UEs. Indication using less than 1 bit of the timing advance command bit field in RAR. Adhering to, and/or catering to, existing 3GPP measurement accuracy requirements.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing coverage of cellular networks.

Technical Clauses:

Clause 1. An apparatus comprising at least one processing core, at least one memory including computer program code, the at least one memory and the computer program code being configured to, with the at least one processing core, cause the apparatus at least to:
  initiate a random access process with a network by transmitting an initial random access message to the network;
  receive a random access response from the network, the random access response comprising a timing advance command bit sequence;
  determine from the timing advance command bit sequence a timing advance value and a configuration parameter, and
  transmit a request message to the network at least once in compliance with the configuration parameter.

Clause 2. The apparatus according to Clause 1, wherein the apparatus is configured to perform the determining of the timing advance value and the configuration parameter from the timing advance command bit sequence by determining the timing advance value from a first subset of numerical values the timing advance command bit sequence can indicate and by determining the configuration parameter from a second subset of numerical values the timing advance command bit sequence can indicate, the first and second subsets not sharing any numerical values.

Clause 3. The apparatus according to Clause 1, wherein the apparatus is configured to perform the determining of the timing advance value and the configuration parameter from the timing advance command bit sequence by determining that the configuration parameter indicates request message repetition responsive to a numerical value indicated by the timing advance command bit sequence exceeding a predetermined threshold value, and when this is the case, by determining the timing advance value based on by how much the numerical value exceeds the predetermined threshold value.

Clause 4. The apparatus according to Clause 1, wherein the apparatus is configured to perform the determining of the timing advance value and the configuration parameter from a first subrange of numerical values the timing advance command bit sequence can indicate and by determining the configuration parameter from a second subrange of numerical values the timing advance command bit sequence can indicate, the first and second subranges not sharing any numerical values, the configuration parameter indicating a number of indicated request message repetitions.

Clause 5. The apparatus according to Clause 1, wherein the apparatus is configured to perform the determining of the timing advance value and the configuration parameter from the timing advance command bit sequence by determining a numerical value indicated by the timing advance command bit sequence, and responsive to the numerical value being less than a preconfigured value, determining the timing advance value based on the numerical value and determining that the configuration parameter indicates no repetitions, and responsive to the numerical value being at least the preconfigured value, determining both the timing advance value and the configuration parameter based on by how much the numerical value exceeds the preconfigured value.

Clause 6. The apparatus according to any of Clauses 1-5, wherein the initial random access message comprises a random access preamble.

Clause 7. The apparatus according to any of Clauses 1-6, wherein the random access response further comprises an uplink grant for the request message.

Clause 8. The apparatus according to any of Clauses 1-7, wherein the initial random access message, the random access response and the request message are comprised in the random access process.

Clause 9. The apparatus according to any of Clauses 1-8, wherein the apparatus is further configured to indicate to the network that the apparatus supports repetition of the request message.

Clause 10. The apparatus according to any of claims 1-9, wherein the configuration parameter is a request message repetition parameter.

Clause 11. An apparatus comprising at least one processing core, at least one memory including computer program code, the at least one memory and the computer program code being configured to, with the at least one processing core, cause the apparatus at least to:
  receive an initial random access message from a user equipment;
  construct a timing advance command bit sequence based on a timing advance value and a configuration parameter;
  transmit a random access response for the user equipment, the random access response comprising the timing advance command bit sequence, and
  receive a request message from the user equipment at least once in compliance with the configuration parameter.

Clause 12. A method comprising:
  initiating a random access process with a network by transmitting an initial random access message to the network;
  receiving a random access response from the network, the random access response comprising a timing advance command bit sequence;
  determining from the timing advance command bit sequence a timing advance value and a configuration parameter, and
  transmitting a request message to the network at least once in compliance with the configuration parameter.

Clause 13. The method according to Clause 12, wherein the determining of the timing advance value and the configuration parameter from the timing advance command bit sequence comprises determining the timing advance value from a first subset of numerical values the timing advance command bit sequence can indicate and by determining the configuration parameter from a second subset of numerical values the timing advance command bit sequence can indicate, the first and second subsets not sharing any numerical values.

Clause 14. The method according to Clause 12, wherein the determining of the timing advance value and the configuration parameter from the timing advance command bit sequence comprises determining that the configuration indicates request message repetition responsive to a numerical value indicated by the timing advance command bit sequence exceeding a predetermined threshold value, and when this is the case, determining the timing advance value based on by how much the numerical value exceeds the predetermined threshold value.

Clause 15. The method according to Clause 12, wherein the determining of the timing advance value and the configuration parameter from the timing advance command bit sequence comprises determining the timing advance value from a first subrange of numerical values the timing advance command bit sequence can indicate and by determining the configuration parameter from a second subrange of numerical values the timing advance command bit sequence can indicate, the first and second subranges not sharing any numerical values, the configuration parameter indicating a number of indicated repetitions.

Clause 16. The method according to Clause 12, wherein the determining of the timing advance value and the configuration parameter from the timing advance command bit sequence comprises determining a numerical value indicated by the timing advance command bit sequence, and responsive to the numerical value being less than a preconfigured value, determining the timing advance value based on the numerical value and determining that the configuration parameter indicates no repetitions, and responsive to the numerical value being at least the preconfigured value, determining both the timing advance value and the configuration parameter based on by how much the numerical value exceeds the preconfigured value.

Clause 17. The method according to any of Clauses 12-16, wherein the initial random access message comprises a random access preamble.

Clause 18. The method according to any of Clauses 12-17, wherein the random access response further comprises an uplink grant for the request message.

Clause 19. The method according to any of Clauses 12-18, wherein the initial random access message, the random access response and the request message are comprised in the random access process.

Clause 20. The method according to any of Clauses 12-19, wherein the method further comprises indicating to the network that the apparatus supports repetition of the request message.

Clause 21. The method according to any of Clauses 12-20, wherein the configuration parameter is a request message repetition parameter.

Clause 22. A method, comprising:
receiving an initial random access message from a user equipment;
constructing a timing advance command bit sequence based on a timing advance value and a configuration parameter;
transmitting a random access response for the user equipment, the random access response comprising the timing advance command bit sequence, and
receiving a request message from the user equipment at least once in compliance with the configuration parameter.

Clause 23. An apparatus comprising:
means for initiating a random access process with a network by transmitting an initial random access message to the network;
means for receiving a random access response from the network, the random access response comprising a timing advance command bit sequence;
means for determining from the timing advance command bit sequence a timing advance value and a configuration parameter, and
means for transmitting a request message to the network at least once in compliance with the configuration parameter.

Clause 24. An apparatus comprising:
means for receiving an initial random access message from a user equipment;
means for constructing a timing advance command bit sequence based on a timing advance value and a configuration parameter;
means for transmitting a random access response for the user equipment, the random access response comprising the timing advance command bit sequence, and
means for receiving the request message from the user equipment at least once in compliance with the configuration parameter.

Clause 25. A non-transitory computer readable medium having stored thereon a set of computer readable instructions that, when executed by at least one processor, cause an apparatus to at least:
initiate a random access process with a network by transmitting an initial random access message to the network;
receive a random access response from the network, the random access response comprising a timing advance command bit sequence;
determine from the timing advance command bit sequence a timing advance value and a configuration parameter, and
transmit a request message to the network at least once in compliance with the configuration parameter.

Clause 26. A non-transitory computer readable medium having stored thereon a set of computer readable instructions that, when executed by at least one processor, cause an apparatus to at least:
receive an initial random access message from a user equipment;
construct a timing advance command bit sequence based on a timing advance value and a configuration parameter;
transmit a random access response for the user equipment, the random access response comprising the timing advance command bit sequence, and
receive a request message from the user equipment at least once in compliance with the configuration parameter.

Clause 27. A computer program configured to cause at least the following to be performed by an apparatus, when run:
initiating a random access process with a network by transmitting an initial random access message to the network;
receiving a random access response from the network, the random access response comprising a timing advance command bit sequence;
determining from the timing advance command bit sequence a timing advance value and a configuration parameter, and
transmitting a request message to the network at least once in compliance with the configuration parameter.

Clause 28. A computer program configured to cause at least the following to be performed by an apparatus, when run:
  receiving an initial random access message from a user equipment;
  constructing a timing advance command bit sequence based on a timing advance value and a configuration parameter;
  transmitting a random access response for the user equipment, the random access response comprising the timing advance command bit sequence, and
  receiving a request message from the user equipment at least once in compliance with the configuration parameter.

The invention claimed is:

1. An apparatus comprising:
  at least one processing core, and
  at least one memory including computer program code,
  the at least one memory storing instructions that when executed by the at least one processing core, cause the apparatus at least to:
    initiate a random access process with a network by transmitting an initial random access message to the network;
    receive a random access response from the network, the random access response comprising a timing advance command bit sequence;
    determine from the timing advance command bit sequence a timing advance value and a configuration parameter, and
    transmit a request message to the network at least once in compliance with the configuration parameter;
  characterized in that the determination from the timing advance command bit sequence a timing advance value,
  wherein a configuration parameter is done by determining that the configuration parameter indicates request message repetition responsive to a numerical value indicated by the timing advance command bit sequence exceeding a predetermined threshold value; and
  determining the timing advance value based on comparison of the numerical value and the predetermined threshold value,
  wherein responsive to the numerical value being less than the predetermined threshold value, determining the timing advance value based on the numerical value and determining that the request message repetition indicates no repetitions, or
  wherein responsive to the numerical value being at least the predetermined threshold value, determining both the timing advance value and the request message repetition based on by how much the numerical value exceeds the predetermined threshold value.

2. The apparatus according to claim 1, wherein the initial random access message comprises a random access preamble.

3. The apparatus according to claim 1, wherein the random access response further comprises an uplink grant for the request message.

4. The apparatus according to claim 1, wherein the initial random access message, the random access response and the request message are comprised in the random access process.

5. The apparatus according to claim 1, wherein the apparatus is further configured to indicate to the network that the apparatus supports repetition of the request message.

6. The apparatus according to claim 1, wherein the configuration parameter is a request message repetition parameter.

7. A method comprising:
  initiating a random access process with a network by transmitting an initial random access message to the network;
  receiving a random access response from the network, the random access response comprising a timing advance command bit sequence;
  determining from the timing advance command bit sequence a timing advance value and a configuration parameter, and
  transmitting a request message to the network at least once in compliance with the configuration parameter;
    characterized in that the determination from the timing advance command bit sequence a timing advance value and a configuration parameter is done by determining that the configuration parameter indicates request message repetition responsive to a numerical value indicated by the timing advance command bit sequence exceeding a predetermined threshold value; and
    determining the timing advance value based on a comparison of the numerical value and the predetermined threshold value,
    wherein responsive to the numerical value being less than the predetermined threshold value, determining the timing advance value based on the numerical value and determining that the request message repetition indicates no repetitions, or
    wherein responsive to the numerical value being at least the predetermined threshold value, determining both the timing advance value and the request message repetition based on by how much the numerical value the predetermined threshold value.

8. A non-transitory computer readable medium encoded with a computer program configured to cause at least the following to be performed by an apparatus, when run:
  initiating a random access process with a network by transmitting an initial random access message to the network;
  receiving a random access response from the network, the random access response comprising a timing advance command bit sequence;
  determining from the timing advance command bit sequence a timing advance value and a configuration parameter, and
  transmitting a request message to the network at least once in compliance with the configuration parameter;
    characterized in that the determination from the timing advance command bit sequence a timing advance value and a configuration parameter is done by determining that the configuration parameter indicates request message repetition responsive to a numerical value indicated by the timing advance command bit sequence exceeding a predetermined threshold value, and when this is the case, by determining the timing advance value based on a comparison of the numerical value and the predetermined threshold value,
    wherein responsive to the numerical value being less than the predetermined threshold value, determining the timing advance value based on the numerical value and determining that the request message repetition indicates no repetitions, or wherein responsive to the numerical value being at least the predetermined threshold value, determining both the timing advance value and the request message repetition based on by how much the numerical value exceeds the predetermined threshold value.

* * * * *